United States Patent [19]

Nowlin et al.

[11] Patent Number: 5,464,532
[45] Date of Patent: Nov. 7, 1995

[54] WATER SOFTENER WITH RESIN BEADS OF DIFFERENT MESH SIZES

[75] Inventors: Duane Nowlin, New Brighton; Bruce Gillett, Marine on the St. Croix, both of Minn.

[73] Assignee: Ecowater Systems, Inc., Woodbury, Minn.

[21] Appl. No.: 396,096

[22] Filed: Feb. 28, 1995

Related U.S. Application Data

[63] Continuation of Ser. No. 266,415, Jun. 27, 1994, abandoned, which is a continuation of Ser. No. 139,328, Oct. 20, 1993, abandoned, which is a continuation of Ser. No. 8,051, Jan. 22, 1993, abandoned, which is a continuation of Ser. No. 775,216, Oct. 11, 1991, abandoned.

[51] Int. Cl.$^6$ .............................. B01D 24/02; C02F 1/42
[52] U.S. Cl. ..................... 210/190; 210/284; 210/290; 210/687
[58] Field of Search ............................ 210/290, 190, 210/191, 283, 285, 286, 284, 686, 687

[56] References Cited

U.S. PATENT DOCUMENTS

| | | | |
|---|---|---|---|
| 1,912,943 | 6/1933 | Lamela | 210/290 |
| 2,298,356 | 10/1942 | Eickmeyer | 210/290 |
| 2,525,497 | 10/1950 | Monfried | 210/290 |
| 2,666,741 | 1/1954 | McMullen | 210/290 |
| 2,692,244 | 10/1954 | Kunin | 210/190 |
| 2,753,302 | 7/1956 | Cioffi | 210/190 |
| 2,767,140 | 10/1956 | Fitch | 210/290 |
| 2,917,368 | 12/1959 | Juda | 210/678 |
| 3,062,739 | 11/1962 | Crits | 210/190 |
| 3,236,367 | 2/1966 | Patterson | 210/290 |
| 3,335,752 | 8/1967 | Hiers | 210/190 |
| 3,382,169 | 5/1968 | Thompson | 210/290 |
| 3,617,558 | 11/1971 | Jones | 210/290 |
| 3,960,721 | 6/1976 | Heskett . | |
| 4,120,786 | 10/1978 | Petersen et al. | 209/454 |
| 4,472,282 | 9/1984 | Crits | 210/675 |
| 4,564,455 | 1/1986 | Flynn et al. | 210/675 |
| 4,581,122 | 7/1989 | Stanley | 210/290 |
| 4,855,043 | 8/1989 | Dalton | 210/290 |
| 5,250,187 | 10/1993 | Franks | 210/661 |

FOREIGN PATENT DOCUMENTS

| | | |
|---|---|---|
| 0040940 | 2/1981 | European Pat. Off. . |
| 21068897 | 5/1987 | Japan .............. 210/290 |
| 514360 | 2/1937 | United Kingdom . |
| 724003 | 2/1955 | United Kingdom . |
| 902347 | 8/1962 | United Kingdom . |
| 1479041 | 7/1977 | United Kingdom . |
| 2085749 | 5/1982 | United Kingdom . |

*Primary Examiner*—Thomas M. Lithgow
*Attorney, Agent, or Firm*—Jon Carl Gealow; Keck, Mahin & Cate

[57] ABSTRACT

A water softening system using resin beads of two or more ranges of mesh sizes with the quantities of each range of resin sizes being in a predetermined proportion to each other.

4 Claims, 1 Drawing Sheet

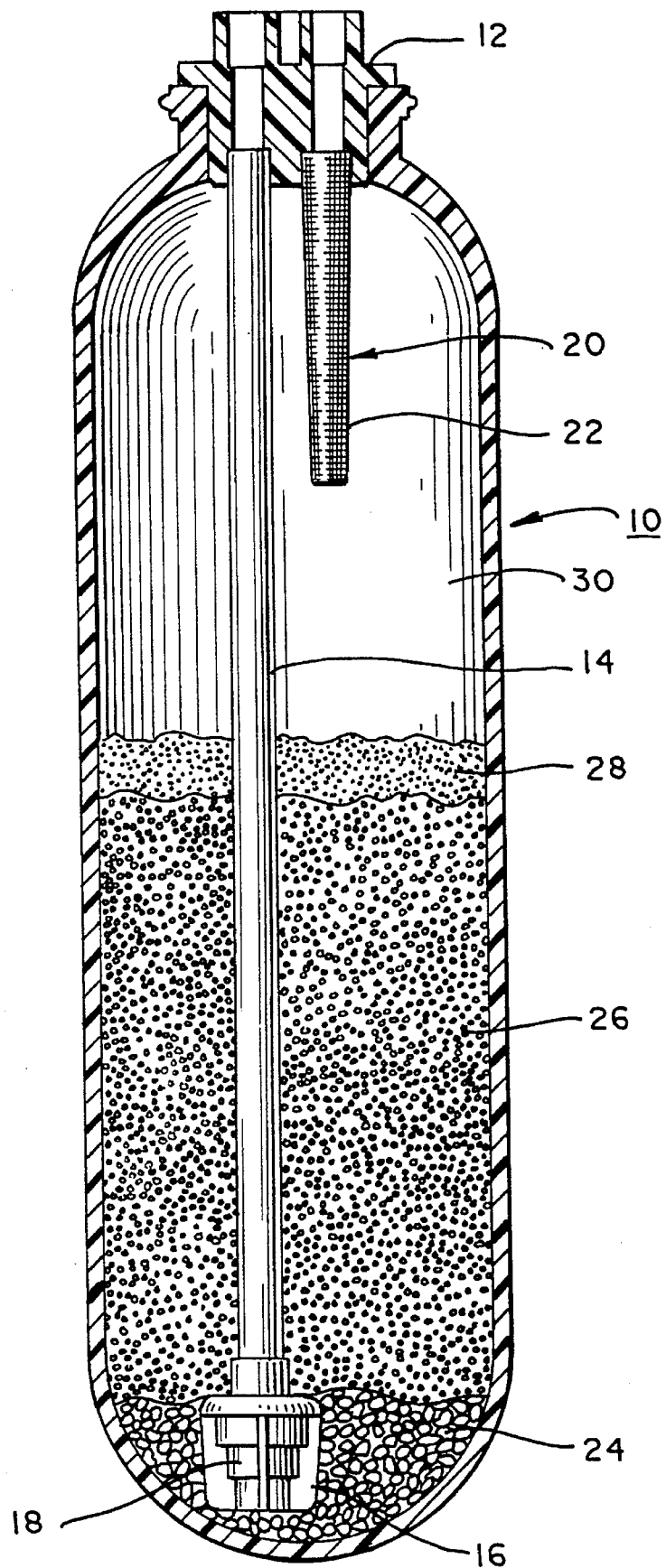

WATER SOFTENER WITH RESIN BEADS OF DIFFERENT MESH SIZES

This is a continuation of application Ser. No. 08/266,415, filed Jun. 27, 1994, which is a continuation of application Ser. No. 08/139,328, filed Oct. 20, 1993, now abandoned, which is a continuation of application Ser. No. 08/008,051, filed Jan. 22, 1993, now abandoned, which is a continuation of application Ser. No. 07/775,216, filed Oct. 11, 1992, now abandoned.

BACKGROUND OF THE INVENTION

1. Field of the Invention

This invention relates to a water softener of the type wherein hard water is passed through ion exchange resin or mineral beads to remove hardness ions from the water. The ion exchange resin, to a limited extent, also removes dissolved iron, by the ion exchange process, and oxidized iron by filtration. The ion exchange resin or mineral beads are recharged to restore their hardness and iron removal capability by passing brine through the resin or mineral beads and by backwashing.

2. Description of Related Art Including Information Disclosed under Secs. 1.97–1.99

In the past it has been the commonly accepted practice to use in a water softener resin beads having a mesh size within a predetermined limited range. Resin beads falling within the sizes of 16 to 40 mesh are considered a "standard mesh" for residential water softeners. Resin beads falling within the sizes of 40 to 50 mesh are considered a "fine mesh" for residential water softeners. As implied by the designation, "standard mesh" is the more commonly used resin size. Fine mesh resin is preferable from the point of view of it being more efficiently regenerated by brine, and for more readily removing dissolve iron and oxidized iron from hard water. The applicants are unaware of any teaching, whether it be a patent or other publication which teaches or suggests the use of resin beads of a combination of different ranges of meshes.

A search for U.S. patents did not uncover any teaching or suggestion of the applicant's invention. The following U.S. Pat. Nos. reveal water processing systems utilizing a mixture of cation and anion exchange resins:

| U.S. Pat. No. | INVENTOR | ISSUE DATE |
| --- | --- | --- |
| 4,120,786 | Petersen et al | 10/17/78 |
| 4,472,282 | Crits | 09/18/84 |
| 4,564,455 | Flynn et al | 01/14/86 |

SUMMARY OF THE INVENTION

Accordingly, it is an object of this invention to provide a water softener employing resin beads of two or more ranges of mesh sizes, in predetermined proportions, which provides improved softening and iron removal capability, and which is more efficiently regenerated when exposed to brine than resin beads of only one range of mesh sizes. It is a further object of this invention to provide a water softener using some fine mesh resin which can employ the more desirable upflow or countercurrent regeneration.

In accordance with this invention, a water softener resin tank is provided which uses a first quantity of fine mesh resin and a second quantity of standard mesh resin. The fine mesh resin includes resin beads having a range of resin sizes which are generally finer than the range of resin sizes for the standard mesh resin beads.

BRIEF DESCRIPTION OF THE DRAWINGS

FIGURE 1 is a side elevation view of resin tank for water softener containing resin beads of mesh sizes in accordance with this invention.

DETAILED DESCRIPTION OF THE PREFERRED EMBODIMENT

Referring to FIGURE 1, a preferred embodiment of this invention will be described. In a typical water softening system, resin beads which remove hardness ions from the hard water to be processed are contained within a pressure tank 10 such as is shown in FIGURE 1. Water flow to and from the tank is through at least a pair of openings provided in a cap 12 at the top of the pressure or resin tank 10. One of the openings is connected to a riser 14 which extends to near the bottom of the pressure tank 10. Flow into and out of the bottom end of the riser 14 is through a bottom distributor 16. The distributor 16 is provided with screens 18 through which water may flow into or out of the riser. Similarly, the second opening in the cap 12 is connected to a top distributor 20 which is provided with a screen 22 through which water may flow into or out of the pressure tank 10.

A layer of gravel 24 provided at the bottom of the tank surrounding the bottom distributor 16, provides for disbursement of the water flow to and from the riser 14 through the bottom of the tank. In accordance with this invention, placed on top of the gravel 24 in the pressure tank 10 is a quantity of standard mesh ion exchange resin or mineral beads 26. Placed on top of the standard mesh resin or mineral beads is a layer 28 of fine mesh resin or mineral beads. A free board area 30 is provided above the fine mesh layer 28 for expansion of the resin bed during regeneration cycles.

In accordance with this invention, the coarser mesh resin beads 26 closer to the bottom of the tank have a mesh size of approximately 16 to 40, which is now considered the "standard mesh" for residential water softeners. The fine mesh resin or mineral beads which are placed on top of the standard or coarser mesh beads have a size of approximately 40 to 50 mesh.

As previously set forth, as compared to standard mesh resin, fine mesh resin would be preferable from the point of view of being more efficiently regenerated by brine, and for more readily removing dissolved iron and oxidized iron from hard water. However, the disadvantage of "fine resin" is that even though finer mesh screens are used at the top and bottom distributors, some of it does escape through the screen. It is undesirable to have to replenish the resin beads which have been flushed from the resin tank.

Still another deterrent to the exclusive use of fine mesh resin is that it cannot be regenerated by upflow or countercurrent brining. In the usual water softener resin tank, hard water enters through the top distributor 20, flows downward through the resin beads and gravel, and is discharged through the bottom distributor 16 and the riser 14 to the distribution system. In the preferred upflow or countercurrent brining for restoration of the resin bed, the brine enters the resin tank through the riser tube 14 and the bottom distributor 16 and flows upward through the resin bed to be discharged through the top distributor 20. However, when only fine mesh resin is used, it has been found that as the brine rises through the resin bed, it lifts and expands the bed of fine resin and passes between the fine resin beads without a significant proportion of the brine making direct contact with the beads. The brine which does not directly contact the beads is discharged from the tank and is in effect wasted. With the standard or coarser beads, the resin bed is not lifted to the extent that a significant portion of the brine can pass through the tank without making contact with the surface of the resin beads.

In accordance with this invention, it has been found that by providing a lower layer of standard mesh or coarser resin 26 and an upper layer 28 of fine mesh resin, the efficiency of the softener system is improved in both the service cycle and the regeneration cycle. Improved operation is realized in the service cycle, wherein the hard water entering the resin bed first passes through the fine mesh resin 28 which has been found to be more efficient in removing iron from the water. With the iron having been removed from the water in passing through the fine mesh resin, the standard mesh resin 26 is more efficient in further removing the hardness of ions from the water.

During the regeneration cycle, the brine first passes upward through the standard resin bed 26, to restore it, and then the partially depleted brine passes through the fine resin 28 to restore its efficiency. The fine mesh resin has been shown to have better kinetics and can be more easily regenerated with a weaker brine solution. Since the upflow of the brine is disbursed throughout the full cross section of the resin tank, there is a lesser tendency to lift and expand the fine mesh resin 28. In a preferred embodiment of this invention, it has been found that the fine mesh resin should be approximately 5% by weight of the total weight of water softening mineral beads in the softener resin tank. However, it has been found that the advantages of this invention can still be realized when the fine resin is in the approximate range of 4–25% of the total weight of resin or mineral beads.

It has been observed that to the extent the fine mesh resin 28 are caused to enter into and partially pass through the standard mesh resin beads 26 during a service cycle when the water is flowing downward through the resin bed, that the upflow regeneration cycle and the backwash cycle will again restore the layer of fine resin beads 28 on top of the layer of standard mesh resin beads 26.

It should be apparent to those skilled in the art that while what has been described is considered at present to be the preferred embodiment of the water softening system of this invention, in accordance with the patent statutes, changes may be made in the water softening system without actually departing from the true spirit and scope of this invention.

The appended claims are intended to cover all such changes and modifications which fall in the true spirit and scope of this invention.

I claim:

1. In a water softening system apparatus having a resin tank containing water softening mineral beads, the resin tank being connected to a hard water flow line, through which flows hard water containing dissolved and/or oxidized iron, a soft water distribution line extending from the resin tank and a regenerate tank in communication with the resin tank, said regeneration tank containing material for generation of a regenerant for intermittent regeneration of said water softening mineral beads, the improvement wherein said water softening mineral beads comprise, a first quantity of water softening mineral beads of a first range of mesh sizes, said first quantity of water softening mineral beads of a first range of mesh sizes being primarily provided to remove dissolved and/or oxidized iron from the hard water, a second quantity of water softening mineral beads of a second range of mesh sizes, said second quantity of water softening mineral beads of a second range of mesh sizes being primarily provided to remove hardness from the hard water, said first quantity of water softening mineral beads being placed on top of said second quantity of water softening mineral beads in said resin tank, said first quantity of water softening mineral beads being of a finer mesh size than said second quantity of water softening mineral beads, with there being a greater amount of said second quantity of water softening mineral beads than of said first quantity of water softening mineral beads when measured by weight, said hard water flow line being connected to said resin tank such that the hard water flows through said first and second quantities of water softening mineral beads from said top of said resin tank to said bottom of said resin tank, and said regenerate tank is in communication with said resin tank such that said regenerate passed through said first and second quantities of water softening mineral beads from the bottom to the top of said resin tank, such that said hard water and said regenerate have a counterflow pattern in said resin tank, wherein said hard water flows first through said first quantity of water softening mineral beads which is more efficient in removing iron from said hard water, and then through said second quantity of water softening mineral beads which is more efficient in removing hardness, and said regenerant flows through the harder to regenerate second quantity of water softening mineral beads before flowing through the easier to regenerate first quantity of water softening mineral beads, and the flow of regenerant first through said second quantity of water softening mineral beads causes said flow of regenerant into and through said first quantity of water softening mineral beads to be dispersed so as to reduce channeling of said flow through said first quantity of water softening mineral beads, and to more efficiently regenerate said first quantity of water softening mineral beads, such that the overall efficiency of regeneration is increased.

2. The water softening system of claim 1, wherein the amount by weight of said first quantity of water softening mineral beads is in the approximate range of 4 to 25 percent of the total weight of said first and second quantities of water softening mineral beads.

3. The water softening system of claim 1, wherein the amount by weight of said first quantity of water softening mineral beads is approximately 5 percent of the total weight of said first and second quantities of water softening mineral beads.

4. The water softening system of claim 1, wherein said first quantity of water softening mineral beads has a mesh size of approximately 40 to 50, and second quantity of water softening mineral beads has a mesh size of approximately 16 to 40.

\* \* \* \* \*